United States Patent [19]
Chang

[11] Patent Number: 5,561,996
[45] Date of Patent: Oct. 8, 1996

[54] GEARSHIFT LOCK

[76] Inventor: Chao S. Chang, No. 57, Sec. 3, Chung Yang Rd., Shan Chung City, Taipei Hsien, Taiwan

[21] Appl. No.: 298,030

[22] Filed: Aug. 30, 1994

[51] Int. Cl.$^6$ ..................................................... E05B 65/12
[52] U.S. Cl. ............................... 70/247; 70/38 A; 70/279
[58] Field of Search .................................. 70/38 A, 38 R, 70/39, 181, 245, 247, 248, 251, 279, 280, 256–258, 275

[56] References Cited

U.S. PATENT DOCUMENTS

| | | | |
|---|---|---|---|
| 1,542,442 | 6/1925 | Fraim | 70/39 |
| 3,979,931 | 9/1976 | Man | 70/38 A |
| 4,290,280 | 9/1981 | Yun | 70/38 A |
| 4,633,688 | 1/1987 | Beudat | 70/279 |
| 4,645,050 | 2/1987 | Ingenhoven | 70/279 |
| 5,214,946 | 6/1993 | Antonello | 70/279 |
| 5,228,320 | 7/1993 | Liou | 70/247 |
| 5,230,231 | 7/1993 | Liou | 70/39 |
| 5,251,466 | 10/1993 | Chang | 70/257 |
| 5,289,907 | 3/1994 | Pattock | 70/248 |
| 5,295,375 | 3/1994 | Jonas | 70/247 |
| 5,372,019 | 12/1994 | Hsiao | 70/38 A |
| 5,398,529 | 3/1995 | Goldman | 70/39 |

FOREIGN PATENT DOCUMENTS

9015910  12/1990  WIPO ..................................... 70/279

Primary Examiner—Steven N. Meyers
Assistant Examiner—Gary Estremsky
Attorney, Agent, or Firm—Peterson, Wicks, Nemer & Kamrath, P.A.

[57] ABSTRACT

A gearshift lock is used to prevent a gearshift from moving with respect to a gearshift seat from which the gearshift extends. The gearshift lock includes a locking box firmly attached on the gearshift seat and includes two passages therein. Two first springs each are respectively received in a corresponding one of the passages of the locking box. A U-shaped latch includes a curved rod and two prongs each of which is received in a corresponding passage of the locking box. A motor is positioned in the locking box and includes a toothed rotor head. A spring-biased engaging device is positioned in the locking box and engaged to the two prongs of the U-shaped latch thus limiting the two prongs of the U-shaped latch in the passages of the locking box and the curved rod of the U-shaped latch enclosing the gearshift thus preventing the gearshift from being moved. A control circuit functions to drive the motor in response to a reception of an effective control signal from a remote control. The motor rotates to drive the spring-biased engaging device to disengage from the two prongs of the U-shaped latch when the control circuit receives an effective control signal, meanwhile the two first springs urge the two prongs of the U-shaped latch out of the passages of the locking box.

1 Claim, 9 Drawing Sheets

PRIOR ART

GEARSHIFT LOCK

BACKGROUND OF THE INVENTION

1. Field of the Invention

The present invention relates to a gearshift lock for locking a gearshift of a car.

2. Description of the Prior Art

Figure 13:
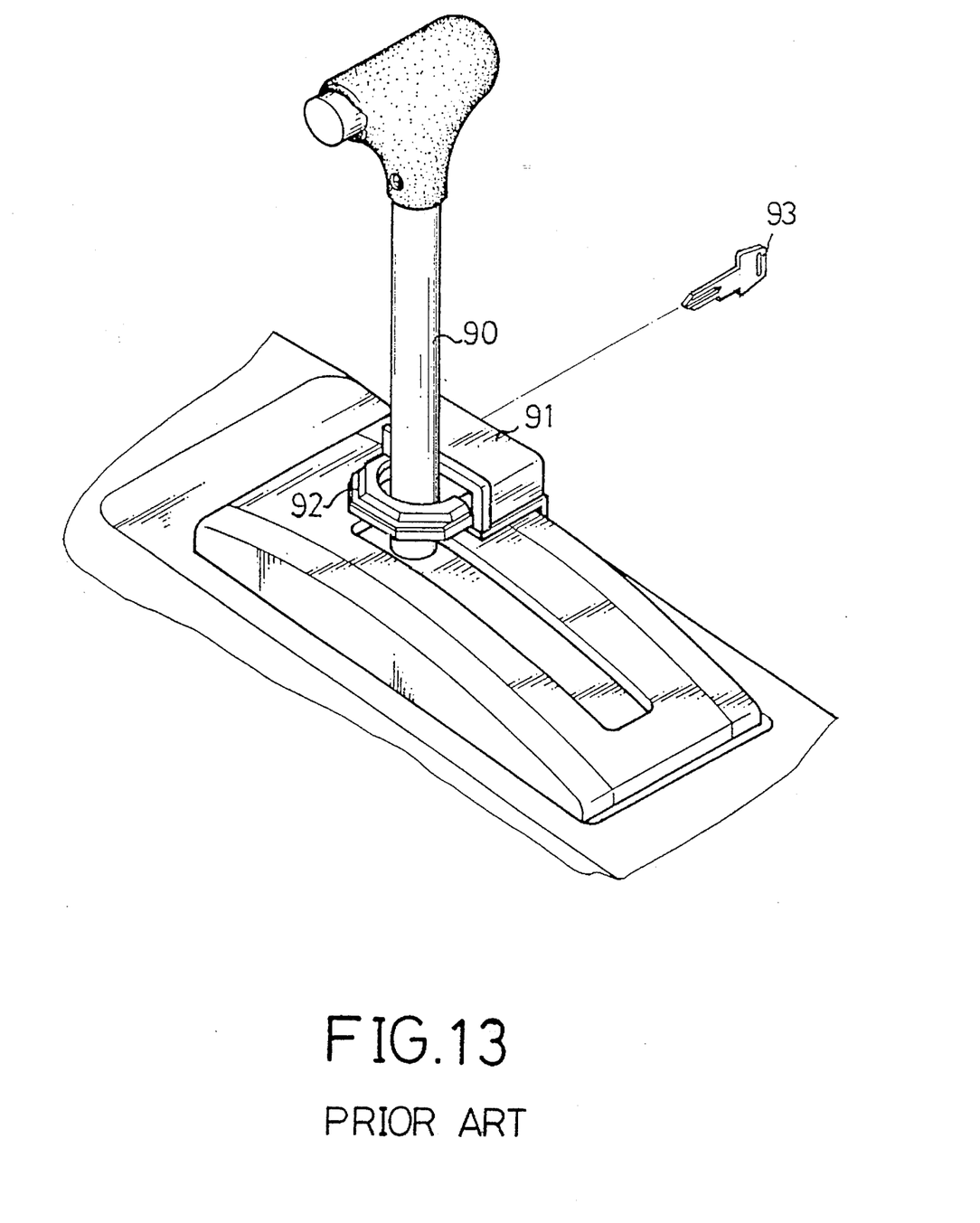
FIG. 13 illustrates a conventional gearshift lock installed on a gearshift seat of a car.

Gearshift locks are used for increasing security of a car at the present time. A conventional gearshift lock as shown in FIG. 13 comprises a bracket 91 which defines a slot (not labeled) therein and firmly mounted on a gearshift seat 5 of the car beside the gearshift 90, and a U-shaped latch 92 enclosing a lower portion of the gearshift 90 and disengageably received in the slot of the bracket 91. The U-shaped latch 92 is disengaged from the bracket 91 by means of a key 93. This conventional lock is simple and has been used for a period of time. However, a thief can easily cut off the gearshift 90 from a lower portion beneath the U-shaped latch 92 by a saw or other tools, then he can use a hook or the like to operate the remaining portion of the gearshift 90. Moreover, cars used at the present time are usually provided with a remote control to open the various locks, therefore the conventional gearshift lock is required to be improved to cooperate with the remote control.

SUMMARY OF THE INVENTION

The primary objective of the present invention is to provide a gearshift lock for locking a gearshift which allows a remote control to release the lock.

It is one aspect of the present invention to provide a gearshift lock for preventing a gearshift from moving with respect to a gearshift seat from which the gearshift extends. The gearshift lock includes a locking box firmly attached on the gearshift seat and includes two passages therein. Two first springs each are respectively received in a corresponding one of the passages of the locking box. A U-shaped latch includes a curved rod and two prongs each of which is received in a corresponding passage of the locking box. A motor is positioned in the locking box and includes a toothed rotor head. A spring-biased engaging device is positioned in the locking box and engaged Go the two prongs of the U-shaped latch thus limiting the two prongs of the U-shaped latch in the passages of the locking box and the curved rod of the U-shaped latch enclosing the gearshift thus preventing the gearshift from being moved. A control circuit is provided to drive the motor in response to a reception of an effective control signal from a remote control. The motor rotates to drive the spring-biased engaging device to disengage with the two prongs of the U-shaped latch when the control circuit receives an effective control signal, meanwhile the two first springs urge the two prongs of the U-shaped latch out of the passages of the locking box.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
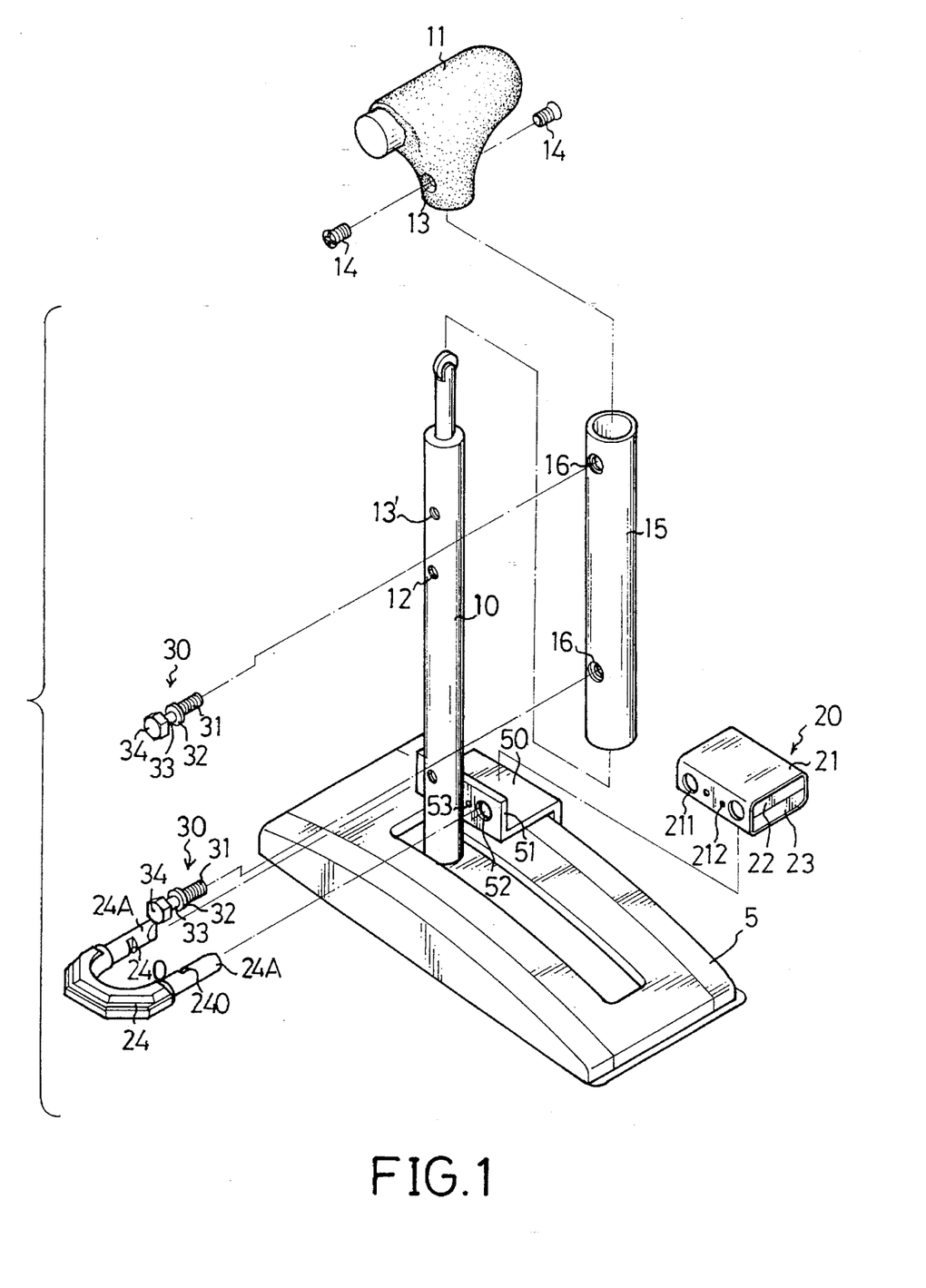
FIG. 1 is a partially exploded view of a gearshift and a gearshift lock therefor.

Referring to the drawings and initially to FIG. 1, a gearshift lock in accordance with a first embodiment of the present invention comprises an outer tube 15 enclosing a gearshift 10 which extends upwardly from a gearshift seat 5 of a car (not shown), a bracket 50 engaged on the gearshift seat 5 substantially beside the gearshift 10 and having an upright wall 51 extended therefrom, a locking box 20 including a front panel firmly attached to the upright wall 51 of the bracket 50, a U-shaped latch 24 having two prongs 24A disengageably received in the locking box 20. Actually the U-shaped latch 24 includes a curved rod (not labeled) and the two prongs 24A extending from two ends of the curved rod. The outer tube 15 has two threaded holes 16 defined thereon and the gearshift 10 also defines two threaded holes 12 each respectively aligned with a corresponding threaded hole 16 of the steel tube 15. For installing the outer tube 15 around the gearshift 10, a handle 11 of the gearshift 10 is defined with a threaded hole 13 and is shown separated from the gearshift 10. A threaded hole 13' is defined in the gearshift 10 and is substantially aligned with the threaded hole 13 of the handle 11 when the latter is installed on an upper portion of the gearshift 10. Two screws 14 are used to secure the handle 11 on the gearshift 10. The outer tube 15 is secured around the gearshift 10 by threading two bolts 30 respectively through an aligned pair of the threaded holes 16 and 12. The locking box 20 defines two relatively large holes 211 and two relatively small holes 212 through one panel thereof. The upright wall 51 of the bracket 50 defines two relatively large holes 52 and two relatively small holes 53 therein and substantially aligned with the holes 211 and 212, respectively in the panel of the locking box 20. The locking box 20 is secured to the upright wall 51 of the bracket 50 by threading two screws (not shown) through the holes 53 and 212. Each bolt 30 is formed with an elongated threaded portion 31, an elongated smooth portion 33, a flange 32 engaged around the elongated smooth portion 33 near the elongated threaded portion 31, and a head 34. The bolt 30 is wrenched into the threaded holes 16, 12 until the flange 32 abuts against a periphery around the hole 16 of the outer tube 15, thereafter the head 34 and the elongated smooth portion 33 are continually wrenched until fracture occurs between the smooth portion 33 and the flange 32 merely leaving the flange 32 to abut against the periphery of the outer tube 15. The flange 32 is circular, thus a thief has to make considerable effort to remove the outer tube 15 from the gearshift 10. Two cutouts 240 each respectively are defined in a corresponding prong 24A and face to each other. The gearshift 10 is locked when the U-shaped latch 24 is engaged to the locking box 20 with the curved rod thereof enclosing the gearshift 10 thus preventing the gearshift 10 from being moved. The curved portion of the U-shaped latch 24 is slightly thicker than the prongs 24A, therefore, when the U-shaped latch 24 is engaged to the locking box 20 the curved portion of the U-shaped latch 24 is substantially seated on an upper surface of the gearshift seat 5 leaving no entrance allowing a saw to cut off a lower portion of the outer tube 15 beneath the U-shaped latch 24.

Figure 2:
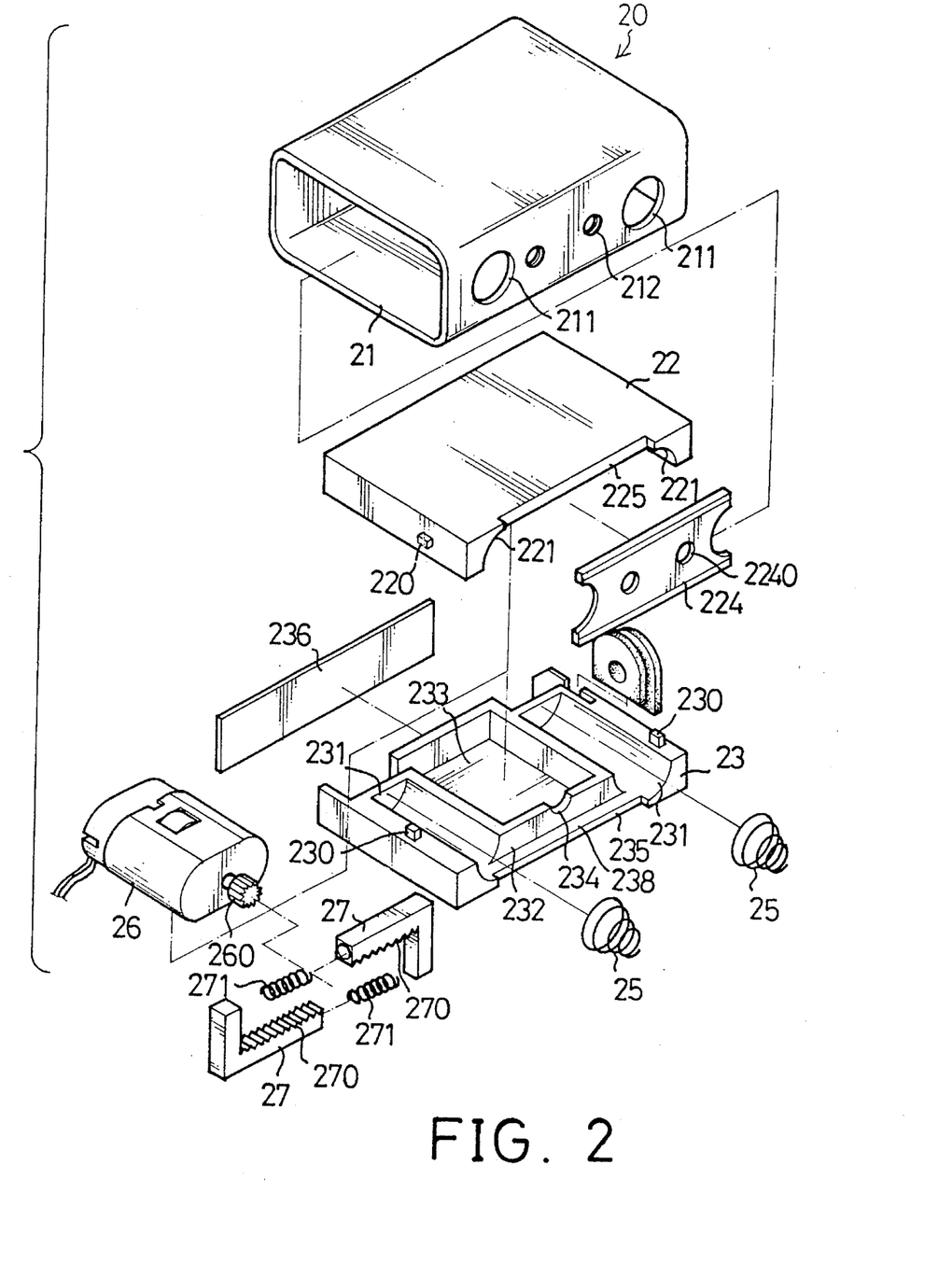
FIG. 2 is an exploded view of a locking box of the gearshift lock, where parts of the locking box are enlarged for illustrative purpose.

Referring to FIG. 2, the locking box 20 comprises a rectangular enclosure 21, an upper half 22 and a lower half 23 being received in the rectangular enclosure 21. The rectangular enclosure 21 defines two relatively large holes 211 and two relatively small holes 212 as mentioned previously referenced with FIG. 1. The two relatively large holes 211 allow the two prongs 24A of the U-shaped latch 24 to pass therethrough. The lower half 23 includes a plurality of walls 232 extending upward and defines a central chamber 233 at substantially a center portion and two elongated passages 231 beside the central chamber 233. The elongated passage 231 has a substantially quadracircular cross-sectional view. A semicircular cutout 234 is defined at a front wall 232 of the chamber 233. A front flange 238 is extended substantially perpendicular to the front wall 232. A front space defined by the front wall 232 and the front flange 238 is in communication with the two elongated passages 231. Two tabs 230 each are projected respectively from a side wall 232 of the lower half 23. The upper half 22 has a very similar structure to the lower half 23 except that two recesses 220 are defined in the corresponding side walls thereof replacing the tabs 230 of the lower half 23. The upper half 22 is engaged to the lower half 23 by receiving the tabs 230 in the recesses 220. When the upper half 22 and the lower half 23 are engaged, a central chamber is defined at a center portion of the two engaged halves 22 and 23, two elongated passages each having a circular cross-sectional view simultaneously defined besides the central chamber, and a front space defined by the front wall 232 and the front flange 238. The two circular elongated passages each respectively receive a spring 25 and a corresponding prong 24A of the U-shaped latch 24. A step motor 26 is positioned and retained in the central chamber defined by the two halves 22 and 23, with a toothed rotor head 260 extending out of the central chamber. A pair of L-shaped rods 27 each having a toothed edge 270 and two springs 271 together are positioned in the front space defined by the two halves 22 and 23. The toothed edges 270 of the two L-shaped rods 27 are meshed with the toothed rotor head 260 of the step motor 26, and the two springs 271 are each engaged between the two L-shaped rods 27 thus together constituting a substantially rectangular structure (see FIGS. 3 and 5). The lower half 23 defines a cutout 235 at the front flange 238 thereof and the upper half 22 also defines a cutout 225 at a corresponding position. A panel 224 including two small holes 2240 is sized to be received between the two cutouts 225 and 235, with the two holes 2240 aligning with the holes 212 of the rectangular enclosure 21. The panel 224 has two side edges which each respectively define a substantially semicircular cutout, therefore when the panel 224 is engaged between the two cutouts 225 and 235 of the upper half 22 and the lower half 235, a substantially circular hole entrance is defined in each side passage. A circuit board 236 is attached to a rear wall 232 of the lower half 23. The circuit board 236 is installed with a remote control circuit for controlling the step motor 26 to rotate forward or rearward.

Figure 3:
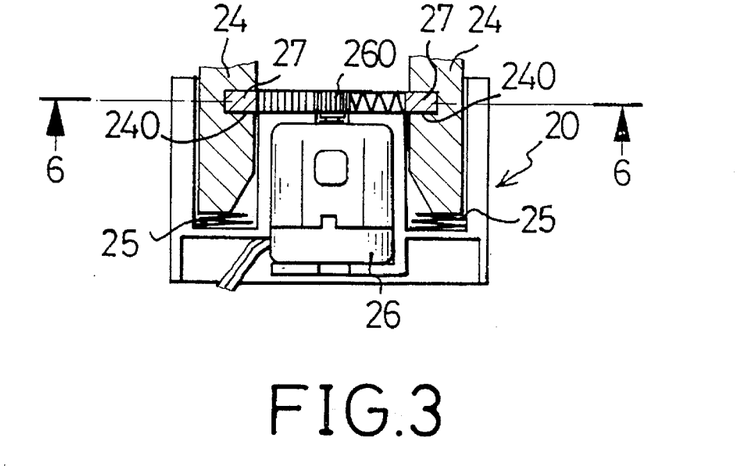
FIG. 3 is a cross-sectional view of the locking box which is in a locked status.
Figure 6:
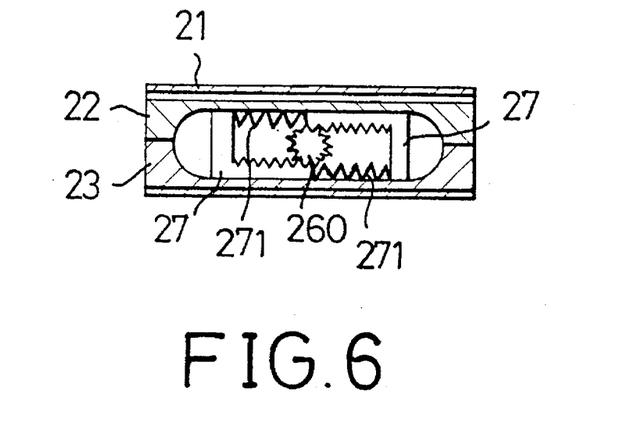
FIG. 6 is a cross-sectional view taken from a line 6—6 of FIG. 3.

Referring to FIGS. 1, 3, and 6, when the gearshift lock is in a locked status, the two prongs 24A of the U-shaped latch 24 are normally inserted into the two circular elongated passages defined by the two halves 22 and 23 and compress the springs 25 in the elongated passages, meanwhile the two L-shaped rods 27 each have an upright rod portion engaged in the cutout 240 of a corresponding prong 24A of the U-shaped latch 24. It should be noted that during the locked status, the two springs 271 expand and force the two L-shaped rods 27 to separate with each other, each spring 271 remaining in a first length, and the upright rod portion of each L-shaped rod 27 is engaged within the cutout 240 of a corresponding prong 24A of the U-shaped latch 24.

Figure 4:
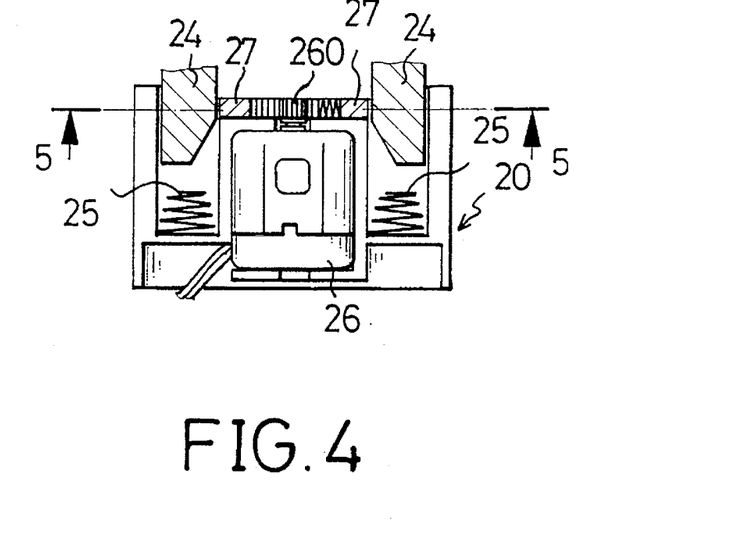
FIG. 4 is a cross-sectional view of the locking box which is in a released status.
Figure 5:
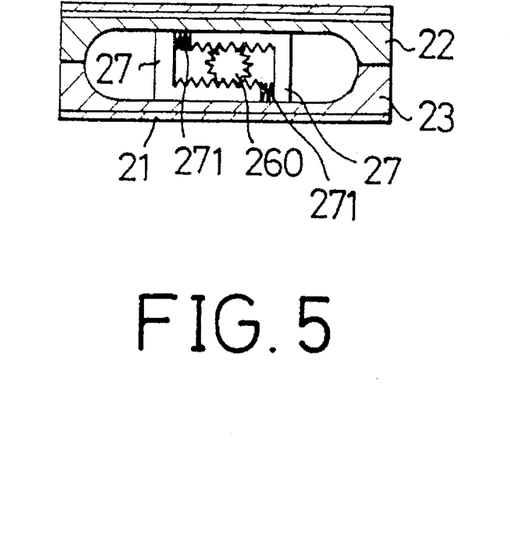
FIG. 5 is a cross-sectional view taken from a line 5—5 of FIG. 4.

Referring to FIGS. 4 and 5, when the gearshift lock is changed from the locked status to a released status, the step motor 26 drives the two L-shaped rods 27 to be closer to each other, meanwhile the springs 271 are compressed to have a second length less than the first length when they are in the locked status, the upright rod portion of each L-shaped rod 27 is disengaged from the recess 240 of the prong 24A of the U-shaped latch 24, and the springs 25 in the elongated passages force the two prongs 24A out of the elongated passages, thereby releasing the gearshift lock.

Figures 7, 9:
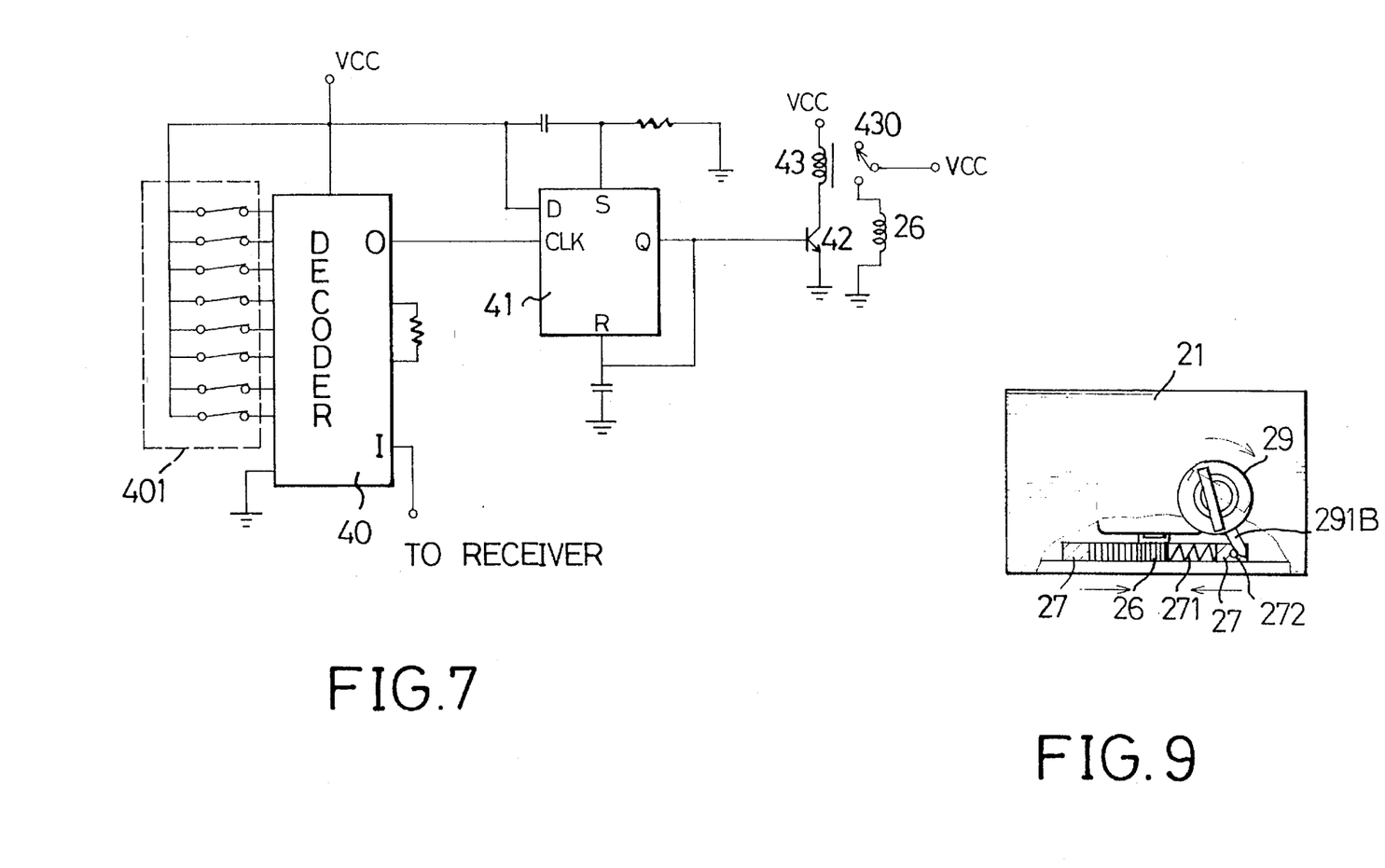
FIG. 7 illustrates a circuit diagram for controlling a step motor of the gearshift lock.
FIG. 9 is a top view of the locking box with a portion therein being illustrated with cross-sectional view for showing how a conventional key may release the lock.

Referring to FIG. 7, a control circuit installed on the circuit board 236 and used to control the step motor 26 is illustrated. The control circuit comprises a decoder 40 and a D-type flip flop 41. A plurality of switches 401 each having one end connected to a DC voltage source VCC and a second end connected to a corresponding setting pin of the decoder 40 is used to set a secret code for the decoder 40. An input pin I of the decoder 40 receives a remote control signal from a receiver which receives the remote control signal from a remote control. An output pin O of the decoder 40 is connected to a clock pin of the D-type flip flop 41. The D-type flip flop 41 has an input pin D connected to the DC voltage source VCC and an output terminal Q connected to a base of an NPN-type transistor 42 which has a collector connected to a coil of a relay 43. The relay has a common contact connected to the DC voltage source VCC, a normally open contact connected to the step motor 26. The relay 43 couples the DC voltage VCC to the step motor 26 thus driving the step motor 26 when the coil of the relay 43 is energized. The decoder 40 outputs a pulse to trigger the D-type flip flop 41 to activate the transistor 42, thereby energizing the relay 43 when the decoder 40 receives a signal matching with the predetermined secret code. Therefore, it is appreciated that when the user operates his remote control, the step motor 26 is driven to release the lock in response.

A second embodiment of the present invention is based on a requirement when the user loses his remote control or when the remote control is broken. In this situation, the locking box 20 of the gearshift lock of the previous embodiment should be modified as hereinafter.

Figure 8:
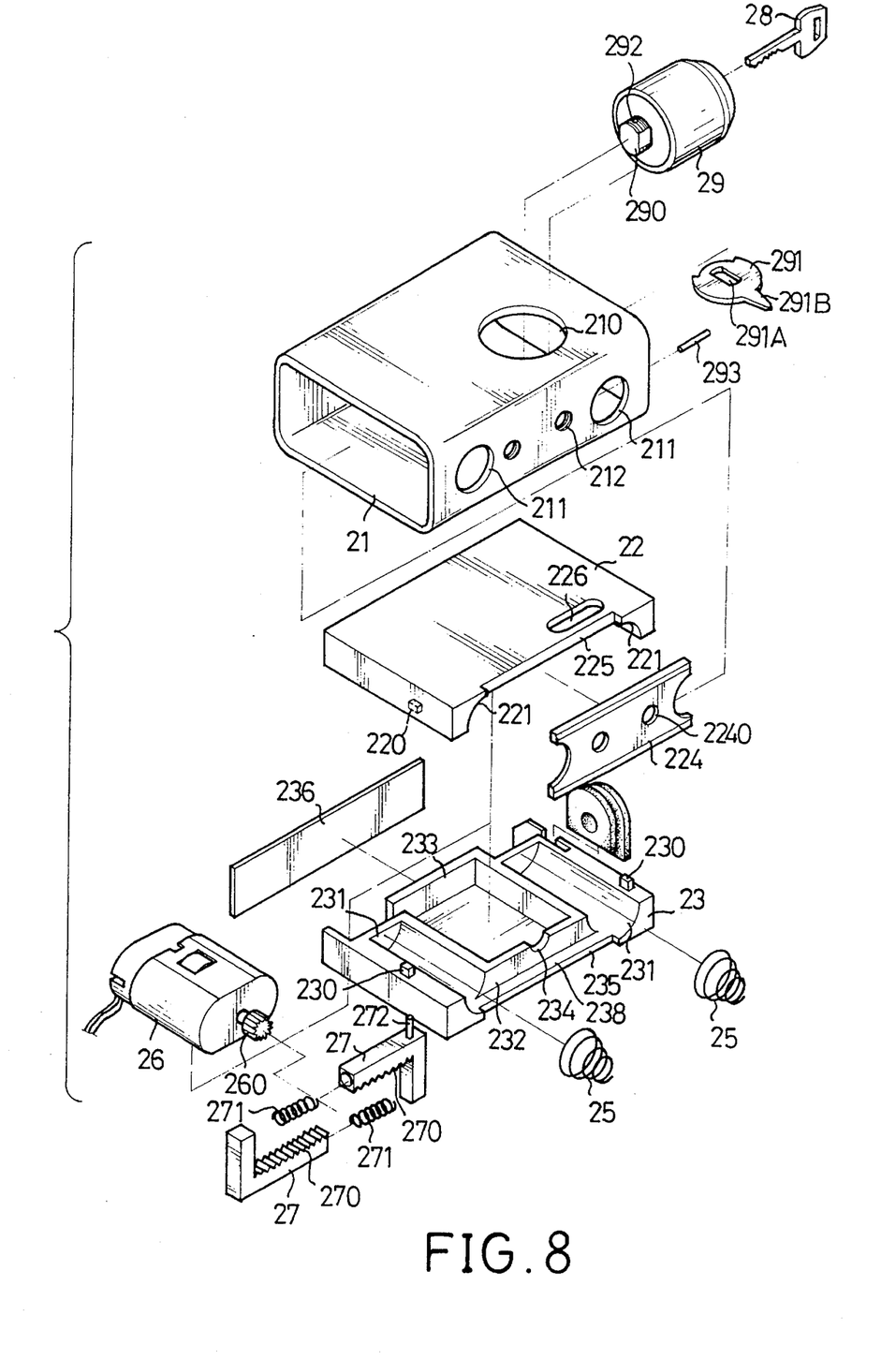
FIG. 8 is an alternative embodiment of the locking box illustrated with an enlarged exploded view for illustrative purpose.

Referring to FIG. 8, the rectangular enclosure 21 defines a hole 210 at an upper surface thereof. A cylinder 29, including a rod 290 extending from a bottom thereof, is mounted on the upper surface of the rectangular enclosure 21, with the rod 290 passing through the hole 210. A hole 292 is defined transversely through the rod 290. A plate 291 defines a hole 291A at substantially a center thereof and an ear 291B extending from a periphery thereof. The plate 291 is engaged around the rod 290 of the cylinder 29, with the ear 291B extending from the periphery of the cylinder 29. A pin 293 is inserted through the hole 292 of the rod 290, with two ends thereof extending out the hole 290 for abutting against the plate 291 and limiting the latter in place. It should be noted that both the hole 291 and the cross-sectional view of the rod 292 are substantially rectangular, therefore the rod 292 can drive the plate 291 to rotate synchronously when a user operates the key 28. The detail of cylinder 29 cooperating with the key is similar to a conventional lock and is omitted herein. The upper half 22 defines an elongated hole 226 substantially above one of the L-shaped rods 27. One of the L-shaped rods 27 has a protrusion 272 extending from an upper corner thereof, protruding upward through the elongated hole 226 of the upper half 22 and being in contact with the ear 291B of the plate 291.

Figure 10:
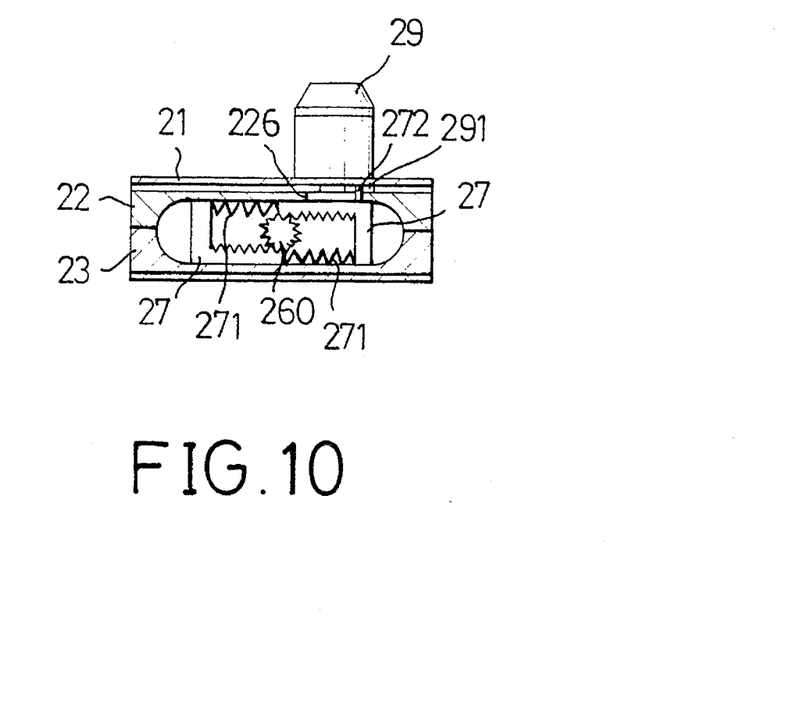
FIG. 10 is cross-sectional view of the locking box of FIG. 9, where the locking box is in a locked status.
Figure 11:
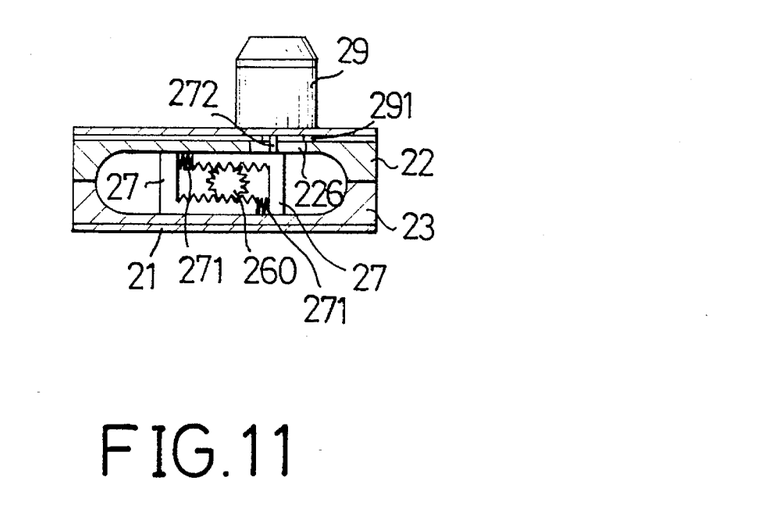
FIG. 11 is cross-sectional view of the locking box of FIG. 9, where the locking box is in a released status.

Referring to FIG. 9, the ear 291B of the plate 291 is shown in contact with the protrusion 272 of the L-shaped rod 27. A user can operate the key 28 thus driving the two L-shaped rods 27 to move toward each other thus releasing the lock as will be explained in more detail. Referring to FIG. 10, the second embodiment of the locking box 20 is in a locked status, where the two springs 271 urge the two L-shaped rods 27 to engage with the two prongs 24A of the L-shaped latch 24 similar to FIG. 6. Further referring to FIG. 9, when a user operates the key 28, the rod 290 (see FIG. 8) of the cylinder 29 will synchronously drive the plate 291, and the ear 291B of the plate 291 can drive the L-shaped rod 27 at the protrusion 272 to drive the toothed head 260 of the motor 26, which in turn drives the other L-shaped rod 27 to move toward the previous L-shaped rod 27 thus together compressing the springs 271 and releasing the U-shaped latch as shown in FIG. 11.

Figure 12:
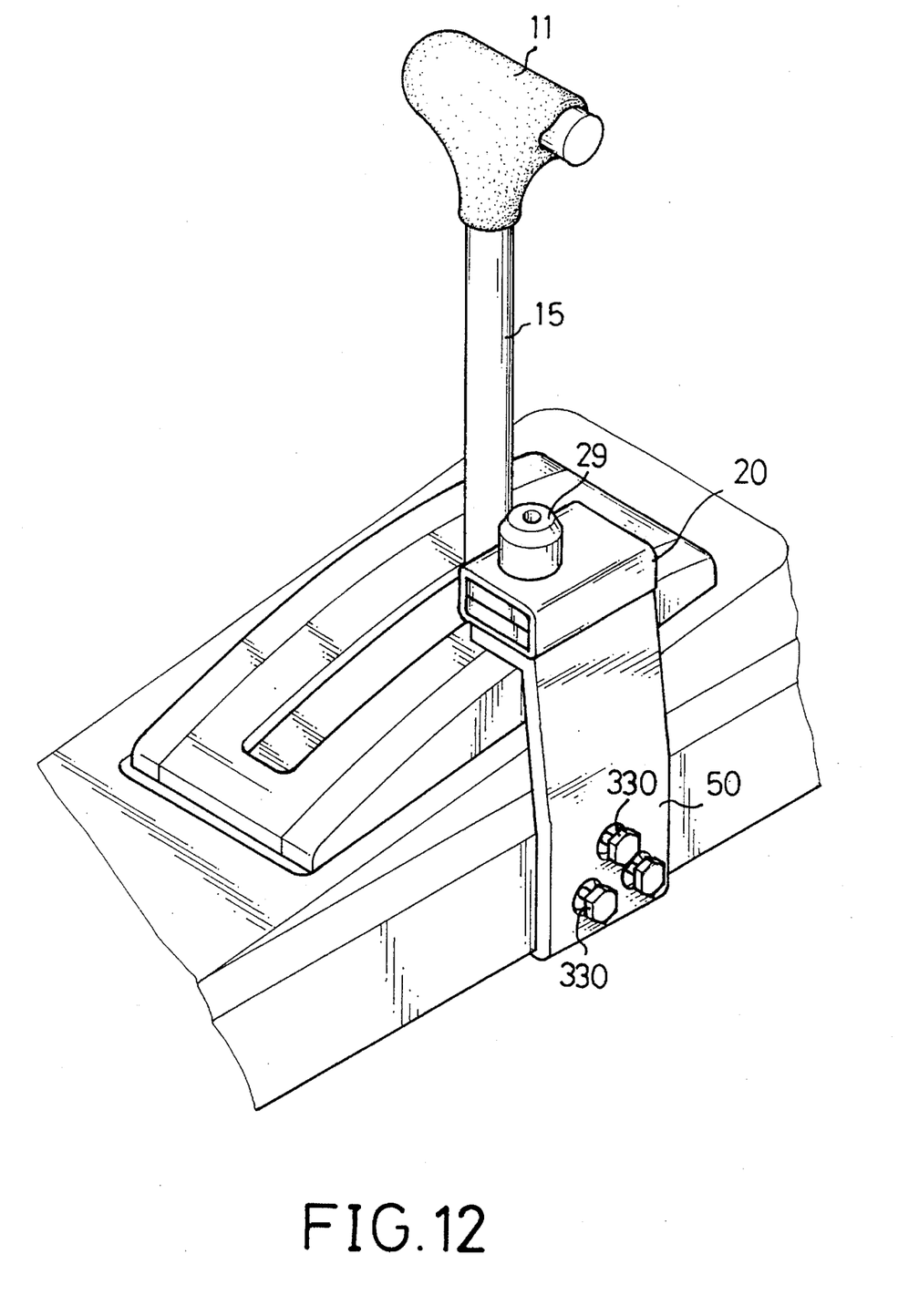
FIG. 12 illustrates the alternative embodiment of the locking box installed on a gearshift seat of a car.

Referring to FIG. 12, the second embodiment of the locking box 20 is fixed on the bracket 50 which is firmly fixed on the gearshift seat 5 by means of three bolts 330.

Although the invention has been explained in relation to its preferred embodiment, it is to be understood that many other possible modifications and variations can be made without departing the spirit and scope of the invention as hereinafter claimed.

I claim:

1. A gearshift lock for presenting a gearshift from moving with respect to a gearshift seat from which the gearshift extends, the gearshift lock comprising:

a locking box adapted to be firmly attached on the gearshift seat and including two passages therein, two first springs each being respectively received in a corresponding one of the passages of the locking box, a U-shaped latch including a curved rod and two prongs each of which is received in a corresponding passage of the locking box, a motor positioned in the locking box and including a toothed rotor head, a spring-biased engaging means positioned in the locking box and engaged to the two prongs of the U-shaped latch thus limiting the two prongs of the U-shaped latch in the passages of the locking box, and the curved rod of the U-shaped latch enclosing the gearshift thus preventing the gearshift from being moved, said spring-biased engaging means including a pair of L-shaped rods each having a toothed edge and two second springs biased between the two L-shaped rods, said two L-shaped rods constituting a substantially rectangular structure, the toothed edges of the two L-shaped rods being meshed with the toothed rotor head of the motor such that the two L-shaped rods are driven by the motor to compress the two second springs thus disengaging from the U-shaped latch and releasing the gearshift lock in response to reception of an effective remote control signal, a control circuit functioning to drive the motor in response to a reception of an effective control signal from a remote control device, a manual driving means located on the locking box as an alternative for the control circuit to manually drive the spring-biased engaging means to be disengaged from the two prongs of the U-shaped latch thus releasing the gearshift lock, the manual driving means being manually rotatable by a key and including a cylinder having a bottom having a rod extending therefrom, a plate secured to the rod and rotated in concert with the rod when the rod is manually operated by the key, the plate including a periphery having an ear extending therefrom, a first of said L-shaped rods having a protrusion extending therefrom and in contact with the ear of the plate so as to allow the ear of the plate to drive the protrusion of the L-shaped rod in order to compress the second springs and so as to release the U-shaped latch, whereby the motor rotates to drive the spring-biased engaging means to disengage with the two prongs of the U-shaped latch when the control circuit receives an effective control signal, meanwhile the two first springs urge the two prongs of the U-shaped latch out of the passages of the locking box.

* * * * *